US011367057B2

(12) United States Patent
Unnerstall

(10) Patent No.: US 11,367,057 B2
(45) Date of Patent: Jun. 21, 2022

(54) SYSTEMS AND METHODS FOR PROVIDING SERVICES RELATED TO ACCESS POINTS FOR NETWORK TRANSACTIONS

(71) Applicant: MASTERCARD INTERNATIONAL INCORPORATED, Purchase, NY (US)

(72) Inventor: Rick Unnerstall, O'Fallon, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 477 days.

(21) Appl. No.: 15/850,654

(22) Filed: Dec. 21, 2017

(65) Prior Publication Data

US 2019/0197500 A1 Jun. 27, 2019

(51) Int. Cl.

| | |
|---|---|
| *G06Q 20/10* | (2012.01) |
| *G06Q 20/36* | (2012.01) |
| *G06T 19/00* | (2011.01) |
| *G06F 9/455* | (2018.01) |
| *G06Q 30/06* | (2012.01) |

(52) U.S. Cl.
CPC ......... *G06Q 20/10* (2013.01); *G06F 9/45558* (2013.01); *G06Q 20/367* (2013.01); *G06Q 30/06* (2013.01); *G06T 19/006* (2013.01)

(58) Field of Classification Search
CPC ...... G06Q 20/10; G06Q 20/367; G06Q 30/06; G06F 9/45558; G06T 19/006
USPC .......................................................... 705/65
See application file for complete search history.

(56) References Cited

U.S. PATENT DOCUMENTS

| | | | |
|---|---|---|---|
| 2008/0301009 A1* | 12/2008 | Plaster ................. | G06Q 10/087 705/28 |
| 2013/0282802 A1* | 10/2013 | Tanimoto ................. | H04L 67/42 709/203 |
| 2015/0012426 A1* | 1/2015 | Purves ............... | G06Q 30/0623 705/41 |
| 2015/0150090 A1* | 5/2015 | Carroll ................ | H04L 63/1425 726/3 |
| 2017/0076408 A1* | 3/2017 | D'Souza ................. | G06Q 40/00 |
| 2017/0221054 A1* | 8/2017 | Flurscheim .......... | G06K 7/1417 |
| 2018/0322700 A1* | 11/2018 | Carr ........................ | A63F 13/25 |
| 2019/0188672 A1* | 6/2019 | Charles ................ | G06Q 20/204 |

* cited by examiner

*Primary Examiner* — Patrick Mcatee
*Assistant Examiner* — Zesheng Xiao
(74) *Attorney, Agent, or Firm* — Harness, Dickey & Pierce, P.L.C.

(57) ABSTRACT

Systems and methods are provided for facilitating network transactions through a virtual terminal assigned to a property. An exemplary method includes assigning, by a computing device, a virtual terminal to a property where the property is associated with a user and activating, by the computing device, the virtual terminal for an account associated with the user. The method also includes soliciting, by the computing device, transaction details from an initiating user, for a network transaction between an account associated with the initiating user and the account of the user, through the virtual terminal in an augmented reality environment when the initiating user is present at the property. The method additionally includes initiating the network transaction based on the transaction details received from the initiating user and the account associated with the user.

18 Claims, 4 Drawing Sheets

US 11,367,057 B2

SYSTEMS AND METHODS FOR PROVIDING SERVICES RELATED TO ACCESS POINTS FOR NETWORK TRANSACTIONS

FIELD

The present disclosure generally relates to systems and methods for providing services to network traffic, and in particular, to systems and methods for providing services to network traffic whereby access points are disposed at different locations to permit initiation of network transactions.

BACKGROUND

This section provides background information related to the present disclosure which is not necessarily prior art.

Network transactions are known to be initiated by different users in different regions and/or under different circumstances. A network transaction may include, for example, a payment account transaction where a consumer or a merchant is initiating the payment account transaction with the other. The payment account transaction may be initiated to pay for a product, such as a good or service, provided from the merchant to the consumer, or as a refund transaction when the consumer returns a product to the merchant. In general, the payment account transaction is initiated at a point of sale (POS) terminal disposed at the merchant, where the POS terminal may include a cash register, for example. In such example, the POS terminal is a physical device programmed to the merchant, to facilitate the payment account transaction (and other payment account transactions) to an account linked to the merchant. Virtual POS terminals are also known to be associated with virtual merchant locations, such as, for example, merchant websites, etc.

Additionally, and apart from the merchant-consumer paradigm described above, a person may be inclined to transfer funds to other persons, for various reasons. Various manners of fund transfer applications and services are known to facilitate the transfers, including, for example, Mastercard Send™ applications, PayPal® applications, bank-associated bill pay services, etc.

DRAWINGS

The drawings described herein are for illustrative purposes only of selected embodiments and not all possible implementations, and are not intended to limit the scope of the present disclosure:

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Payment account transactions are often initiated at point-of-sale (POS) terminals associated with merchants, or between dedicated applications that are either specific to a location or not. When a POS terminal is employed, a consumer of the transaction provides payment account credentials to a merchant associated therewith, for example, by swiping a payment account card at the POS terminal. Or, when the transaction is facilitated by an application, the consumer (or other transferor of funds) provides the payment account credentials to the merchant (or other recipient), or at least a phone number or other designator associated with the consumer, thereby permitting the transaction to be initiated and/or a payment account to be identified.

Uniquely, the systems and methods herein provide virtual terminals in association with particular locations of transferors/recipients, whereby the transferors/recipients interact with the virtual terminals at the locations to initiate one or more transactions. In particular herein, a virtual terminal engine may assign a virtual terminal to a property, i.e., a distinct location (where different virtual terminals may be assigned by the engine to multiple different properties). The virtual terminal is then activated to an account issued and/or provided to a user associated with the property (e.g., an owner, a leaseholder, etc.). In turn, a transferor or recipient of funds for a given transaction, to be performed with the user, may initiate the transaction with the user (via the virtual terminal) by navigating to the virtual terminal, in augmented reality and at the distinct location of the user, and then interacting with the virtual terminal to provide payment account credentials, etc. to facilitate the transaction. The user may be notified, or asked for permission for the transaction to proceed, and then after approval of the transaction, the user and/or the recipient/transferor may be notified of the transaction. In this manner, the transaction is initiated and approved without the user necessarily providing identity information to the recipient/transferor, or vice versa. As can be appreciated, this may provide, in some instances, enhanced purchase protection over conventional transaction, etc.

Figure 1:
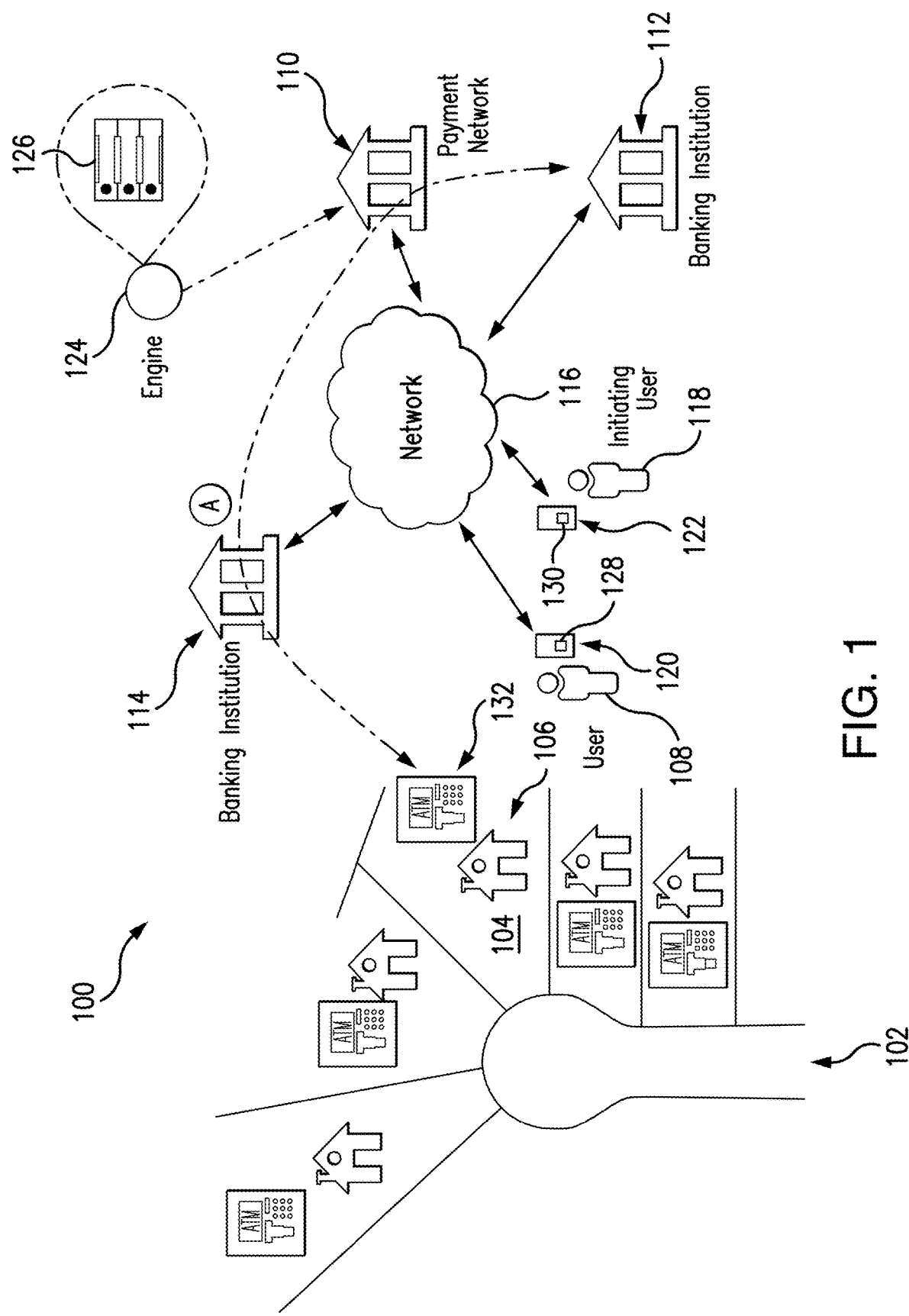
FIG. 1 illustrates an exemplary system for use in facilitating payment account transactions between consumers and merchants via virtual terminals associated with specific properties.

FIG. 1 illustrates an exemplary system 100 in which one or more aspects of the present disclosure may be implemented. Although the system 100 is presented in one arrangement, other embodiments may include systems arranged otherwise depending, for example, on a number of merchants, acquirers, issuers, payment networks, networks, and/or regions included therein, etc.

In the illustrated embodiment, the system 100 generally includes a neighborhood 102 having multiple different properties, one of which is referenced as property 104. The properties may include any geographically distinct locations and/or parcels of land, of any size, and segregated for any purpose. In the exemplary embodiment of FIG. 1, again, the illustrated properties include residential properties within the neighborhood 102, upon which residences or homes are constructed. The property 104 then includes a residence 106, in which a user 108 resides. Nonetheless, it should be appreciated that other types of structures and/or other buildings may be constructed on the different types of properties, where the structures and/or buildings may be residential or commercial, and may include businesses, office buildings, workshops, restaurants, retail shops, temporary vendors, etc. That said, one or more different properties may be bare and/or devoid of one or more structures and/or buildings as well.

The property 104 in the system 100 (like the other properties therein) is associated the user 108 (e.g., an individual or multiple individuals, an entity other than an individual, etc.). In this example, the user 108 is the owner of the property 104 located within the neighborhood 102. With that said, it should be appreciated that a user's association with a property in the system 100 may often be dependent on the type of the property. For example, for residential properties, as shown in FIG. 1, the properties will often be associated with a person or multiple persons (e.g., owners, trusts, tenants, etc.). When a residence is different than a single family home, the property may be segregated based on different locations within the property (e.g., units within an apartment at the property, different units spread across the property, etc.) where each segregated part of the property may be considered, in this disclosure, to be a separate property and also associated with one or more users. For a commercial property, again, the property may be associated with one business, or perhaps, multiple businesses (e.g., tenants in a shopping center or an office building, etc.). A shopping mall property, for example, may be segregated based on different locations within the property (e.g., units within the property), where each segregated part of the shopping mall property (e.g., as defined by a space/location rented, leased, or owned by the associated user, etc.) may be considered, in this disclosure, to be a separate property and also associated with one or more users (e.g., merchants within the shopping mall property assigned to a segregated part of the property, etc.). It should be appreciated, therefore, that any different type of property may be associated with any different type of individual or entity within the scope of the present disclosure.

In at least one embodiment, a property may be associated with multiple individuals and/or entities (e.g., the property may not be divisible, by location, among the individuals and/or entities; etc.). In such an embodiment, the users are each associated with and/or specific to the property, for purposes of the description herein.

Apart from the neighborhood 102 and the properties therein (including property 104), the system 100 further includes a payment network 110, which is configured, as is conventional, to facilitate payment account transactions between banking institutions, such as, for example, banking institutions 112 and 114. As further shown in FIG. 1, each of the payment network 110 and banking institutions 112 and 114 are coupled to (and are in communication with) network 116. The network 116 may include, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. For example, network 116 may include multiple different networks, such as a private payment transaction network made accessible by the payment network 110 to the banking institutions 112 and 114, and, separately, the public Internet, which may be accessible as desired to computing devices (e.g., devices 120 and 122, etc.) associated with different users in the system 100 (e.g., users 108 and 118, etc.), as described below, etc.

The banking institutions 112 and 114 may be referred to herein as acquirers and/or issuers, depending on the roles they play in payment account transactions. In one example in the system 100, the banking institution 112 has issued a payment account, generally, or specifically to the user 108, whereby the user 108 may use the payment account to provide funds (or receive funds) transferred pursuant to payment account transactions. The account may include, for example, a prepaid account, a debit account, a checking account, a credit account, or other suitable type of account, etc. Also in the system 100, initiating user 118 (e.g., an individual or entity, etc.) is associated with an account issued by the banking institution 114, which may again be any type of account (including those listed above for the user 108). The initiating user 118 is included in this example to initiate a payment account transaction with the user 108 (e.g., to purchase product(s) or service(s), solicit funds for service(s) rendered or product(s) delivered, etc.) as described in more detail below and in accordance with the unique features of the present disclosure.

Also in the system 100, the user 108 and the initiating user 118 are associated with communication devices 120 and 122, respectively. The communication devices 120 and 122 may include, without limitation, smartphones, tablets, laptops, or other suitable communication devices. While only the two users 108 and 118 and the two communication devices 120 and 122 are illustrated in FIG. 1, it should be appreciated that the system 100 may include multiple users and communication devices in other embodiments (even though not illustrated herein).

Figure 2:
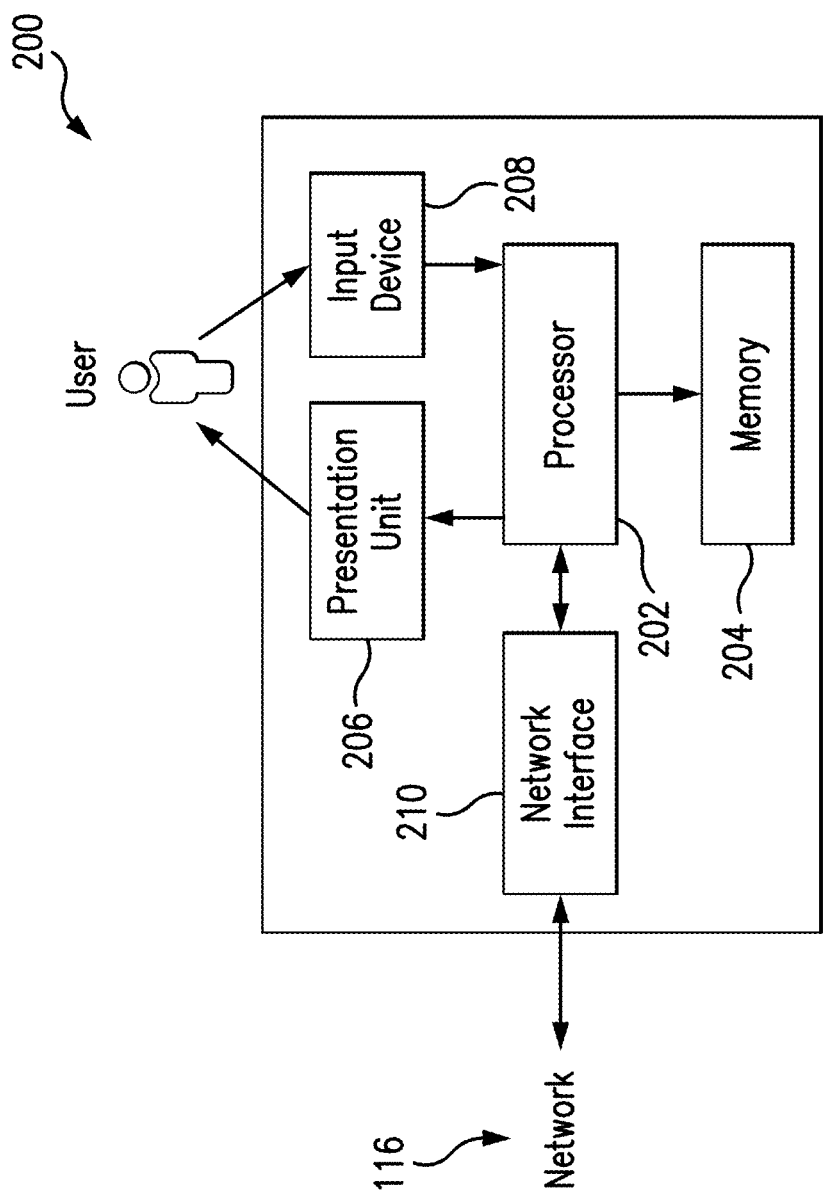
FIG. 2 is a block diagram of an exemplary computing device that may be used in the system of FIG. 1.

FIG. 2 illustrates an exemplary computing device 200 that can be used in the system 100. The computing device 200 may include, for example, one or more servers, workstations, personal computers, laptops, tablets, smartphones, PDAs, POS devices, etc. In addition, the computing device 200 may include a single computing device, or it may include multiple computing devices located in close proximity or distributed over a geographic region, so long as the computing devices are specifically configured to function as described herein. In particular, in the exemplary system 100 of FIG. 1, each of the payment network 110 and the banking institutions 112 and 114 may include, or may be implemented in, at least one computing device consistent with the computing device 200 and coupled to the network 116. What's more, each of the communication devices 120 and 122 may be considered computing devices consistent with the computing device 200. That said, however, the system 100 should not be considered to be limited to the computing device 200, as described below, as different computing devices and/or arrangements of computing devices may be used. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, transaction data, property designations and/or locations, and/or other types of data (and/or data structures) suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 that is performing one or more of the various operations herein. It should be appreciated that the memory 204 may include a variety of different memories, each implemented in one or more of the functions or processes described herein.

In addition in the exemplary embodiment, the computing device 200 includes a presentation unit 206 that is coupled to (and that is in communication with) the processor 202 (however, it should be appreciated that the computing device 200 could include output devices other than the presentation unit 206, etc.). The presentation unit 206 outputs information (e.g., locations of virtual terminals, etc.), either visually or audibly to a user of the computing device 200 as part of the system 100 (e.g., to user 108, user 118, etc.), etc. Various interfaces (e.g., as defined by network-based applications, etc.) may be displayed at computing device 200, and in particular at presentation unit 206, to display such information. The presentation unit 206 may include, without limitation, a liquid crystal display (LCD), a light-emitting diode (LED) display, an organic LED (OLED) display, an "electronic ink" display, speakers, etc. In some embodiments, presentation unit 206 may include multiple devices.

The computing device 200 also includes an input device 208 that receives inputs from the user (i.e., user inputs) such as, for example, selections of virtual terminals, entries of account numbers, etc. The input device 208 is coupled to (and is in communication with) the processor 202 and may include, for example, a keyboard, a pointing device, a touch sensitive panel (e.g., a touch pad or a touch screen, etc.), another computing device, and/or an audio input device. Further, in various exemplary embodiments, a touch screen, such as that included in a tablet, a smartphone, or similar device, may behave as both the presentation unit 206 and the input device 208.

In addition, the illustrated computing device 200 also includes a network interface 210 coupled to (and in communication with) the processor 202 and the memory 204. The network interface 210 may include, without limitation, a wired network adapter, a wireless network adapter, a mobile network adapter, or other device capable of communicating to/with one or more different networks, including the network 116. Further, in some exemplary embodiments, the computing device 200 may include the processor 202 and one or more network interfaces (including the network interface 210) incorporated into or with the processor 202.

Referring again to FIG. 1, the system 100 further includes a virtual terminal engine 124 and a virtual terminal data structure 126 coupled to the virtual terminal engine 124. In the illustrated embodiment, the virtual terminal engine 124 and the virtual terminal data structure 126 are associated with the payment network 110 as indicated by the dotted line. In addition, the virtual terminal engine 124 and the virtual terminal data structure 126 are each embodied in a computing device consistent with computing device 200. That said, the virtual terminal engine 124 and/or the virtual terminal data structure 126 may be one or more standalone computing devices and/or each may exist in one or more separate computing devices in other system embodiments.

The virtual terminal engine 124 is configured, by executable instructions (e.g., stored in memory 204 of the engine 124, etc.), to perform the operations described herein, whereby the instructions cause the engine 124 to operate in the unique manner described herein.

In this exemplary embodiment, the virtual terminal data structure 126 includes a listing of properties within a given region, such as, for example, within the neighborhood 102. For each of the distinct properties, such as the property 104, the virtual terminal data structure 126 includes a property profile. The property profile includes at least a unique property identifier and a location and/or description of the property (e.g., a street address of the property, coordinates, a legal description, etc.). The property profile may include further information, such as, for example, identifying information for the user associated with the property. For example, the property profile for the property 104 may include a name and email address associated with the user 108. The property profiles may also include additional information associated with the corresponding properties such as, for example, school districts, owner addresses, parcel IDs, property classes, zoning information, occupant status (e.g., owner versus renter, etc.), and/or other information particular to the properties (e.g., events taking place at the properties (e.g., garage or estate sales, etc.) and timings associated therewith, etc.). It should also be appreciated that information included in the property profiles may be modifiable (e.g., by owners associated with the corresponding properties, etc.) (e.g., to indicate that new events are taking place at the properties at certain times, etc.).

Also in this exemplary embodiment, a network-based application 128 is included in the communication device 120, and a network-based application 130 is included in the communication device 122. The applications 128 and 130 may be the same, or different, but both provide interaction between the respective communication devices 120 and 122 and the virtual terminal engine 124. The applications 128 and 130 may be, for example, virtual wallet applications, whereby when provisioned, the applications 128 and 130 include payment account credentials associated with the accounts issued by the banking institutions 112 and 114 to the users 108 and 118, respectively. In other embodiments, the applications 128 and 130 may be standalone applications, or integrated into different applications, which are not virtual wallet applications. Regardless, however, the applications 128 and 130 include augmented reality functionalities such that data included in the applications 128 or 130 and/or data from the virtual terminal engine 124 combines with data captured from the input device 208 of the respective one of the communication devices 120 or 122 (e.g., a camera input device, etc.) to provide an augmented reality environment for use as described herein.

In operation of the system 100, the virtual terminal engine 124 is configured to assign virtual terminals (e.g., virtual terminal 132, etc.) to the properties in the neighborhood 102 and, for each property assigned a virtual terminal, to append a virtual terminal ID (or identifier) associated with the assigned virtual terminal to the property profile for the property. Specifically, for example, the virtual terminal engine 124 is configured to assign the virtual terminal 132 to the property 104 and to append a virtual terminal ID for the virtual terminal 132 (e.g., a numeric value such as 123456, an alpha numeric value, another value, etc.) to the property profile for the property 104. It should be appreciated that the virtual terminal engine 124 may be configured to assign a virtual terminal to each of the properties in the neighborhood 102 based on the properties being included in the virtual terminal data structure 126. Additionally, or alternatively, the virtual terminal engine 124 may be configured to assign virtual terminals to the properties in response to requests from users associated with the properties (e.g., in response to a request by one of the individuals and/or entities described above, etc.).

When and/or after the virtual terminal 132 is assigned to the property 104, for example, but before the virtual terminal 132 is activated, the virtual terminal engine 124 is configured to notify the user 108 associated with the property 104 that the virtual terminal 132 is being assigned to the property 104. Such notification may include, for example, a message to the communication device 120 associated with the user 108, via the application 128, etc.

Once notified, the user 108 may access the application 128 and attempt to activate the virtual terminal 132. To do so, the user 108 may navigate to the property 104 (if not already there) to interact with the virtual terminal 132 through an augmented reality environment associated with the property 104. In one example, the virtual terminal 132 is not viewable by other users in the augmented reality environment until the virtual terminal 132 is activated, and potentially, is not viewable by the user 108 in the augmented reality environment until such activation unless the user 108 is located at (or proximate to) the property 104 to which the virtual terminal 132 is assigned. When interacting with the virtual terminal 132, the communication device 120, as configured by the application 128, solicits activation of the virtual terminal 132 from the user 108, and, when appropriate, accepts the user's instruction (e.g., at the input device 208 of the communication device 120, etc.) to activate the virtual terminal 132 and provides activation data to the virtual terminal engine 124.

In connection therewith, the activation data includes data related to the payment account issued to the user 108 by the banking institution 112, along with other suitable details (e.g., those discussed in relation to FIG. 3 below, etc.). In response, the virtual terminal engine 124 is configured to activate the virtual terminal 132 and associate the activation data (e.g., the payment account issued to the user 108, etc.) with the virtual terminal 132. When the virtual terminal 132 is public (e.g., and upon being activated, etc.), the virtual terminal engine 124 is further configured to append the virtual terminal 132 to a public listing of virtual terminals (in the virtual terminal data structure 126) to be offered to initiating users. Conversely, when access to the virtual terminal 132 is limited (e.g., by the user 108, etc.), the virtual terminal engine 124 is configured to append the virtual terminal 132 to a private listing of virtual terminals (in the virtual terminal data structure 126) (e.g., which are only to be offered and/or viewable to identified initiating users, etc.). In some embodiments, the virtual terminal engine 124 may be configured to broadcast and/or provide information to users (e.g., initiating user 118, etc.) indicating that a virtual terminal 132 is located at the property 104. For example, the virtual terminal engine 124 may be configured to provide information to a portal accessible by users (e.g., including initiating user 118, etc. as accessible via the application 130 and/or communication device 122, etc.) indicating that there is an event (e.g., a garage or estate sale, etc.) at the property 104 where payment is accepted via a virtual terminal (e.g., virtual terminal 132, etc.). Alternatively, or additionally, the virtual terminal engine 124 may be configured to broadcast and/or provide information to network-based applications or devices associated with the virtual terminal engine 124 (e.g., application 130 and/or communication device 122, etc.) indicating the same.

Subsequently in the system 100, and regardless of the manner by which the initiating user 118 learns of the property 104, the initiating user 118 may desire to initiate a payment account transaction with the user 108, with funds being passed from the initiating user 118 to the user 108, or vice-versa. To do so, the initiating user 118 travels to the property 104, if not already there, and attempts, through the augmented reality environment, provided at the communication device 122 at the location of the virtual terminal 132 at the property 104, to locate the virtual terminal 132.

When the virtual terminal 132 is found, the initiating user 118 interacts with the virtual terminal 132, through the augmented reality environment and/or the communication device 122, as configured by the application 130. In connection with the interaction, the initiating user 118 may identify his/her payment account, at the communication device 122, via the application 130, for use in the transaction, along with an amount of the transaction and a note/description of the transaction, etc. Further, the initiating user 118 may submit the transaction, by the communication device 122, via the application 130, to the virtual terminal engine 124. In turn, the virtual terminal engine 124 is configured to, optionally, notify the user 108, at the communication device 120, via the application 128, and request permission for the transaction (e.g., including the amount and/or note/description of the transaction, etc.). If necessary, the communication device 120, as configured by the application 128, may solicit permission from the user 108, and when given, provide the permission to the virtual terminal engine 124.

When permitted/approved, the virtual terminal engine 124 is configured to then initiate the transaction through and/or among the payment network 110 and the banking institutions 112 and 114 (i.e., for a transfer between accounts held at the banking institutions 112 and 114). The transaction may include a credit transaction, an ACH transaction, or other transaction, etc. (e.g., depending on the types of accounts involved, etc.). When the transaction is approved, by the banking institution 112, for example (or vice versa by the banking institution 114), the virtual terminal engine 124 is configured to inform the banking institution 114 and then to inform one or both of the user 108 at the communication device 120, via the application 128, and the initiating user 118 at the communication device 122, through the application 130. To combat fraud, the virtual terminal engine 124 may be configured to keep a score for user 108 and/or initiating user 118 as transactions involving each user accumulate, where the score is based on successful transactions (e.g., "100% transaction success," etc.). The virtual terminal engine 124, then, may be configured to provide a score for a user (e.g., user 108, etc.) selling items or accepting payment via a virtual terminal to another user that is a prospective purchaser of those items or payor (e.g., initiating user 118) (or vice versa) before a transaction is initiated via the virtual terminal.

Figure 3:
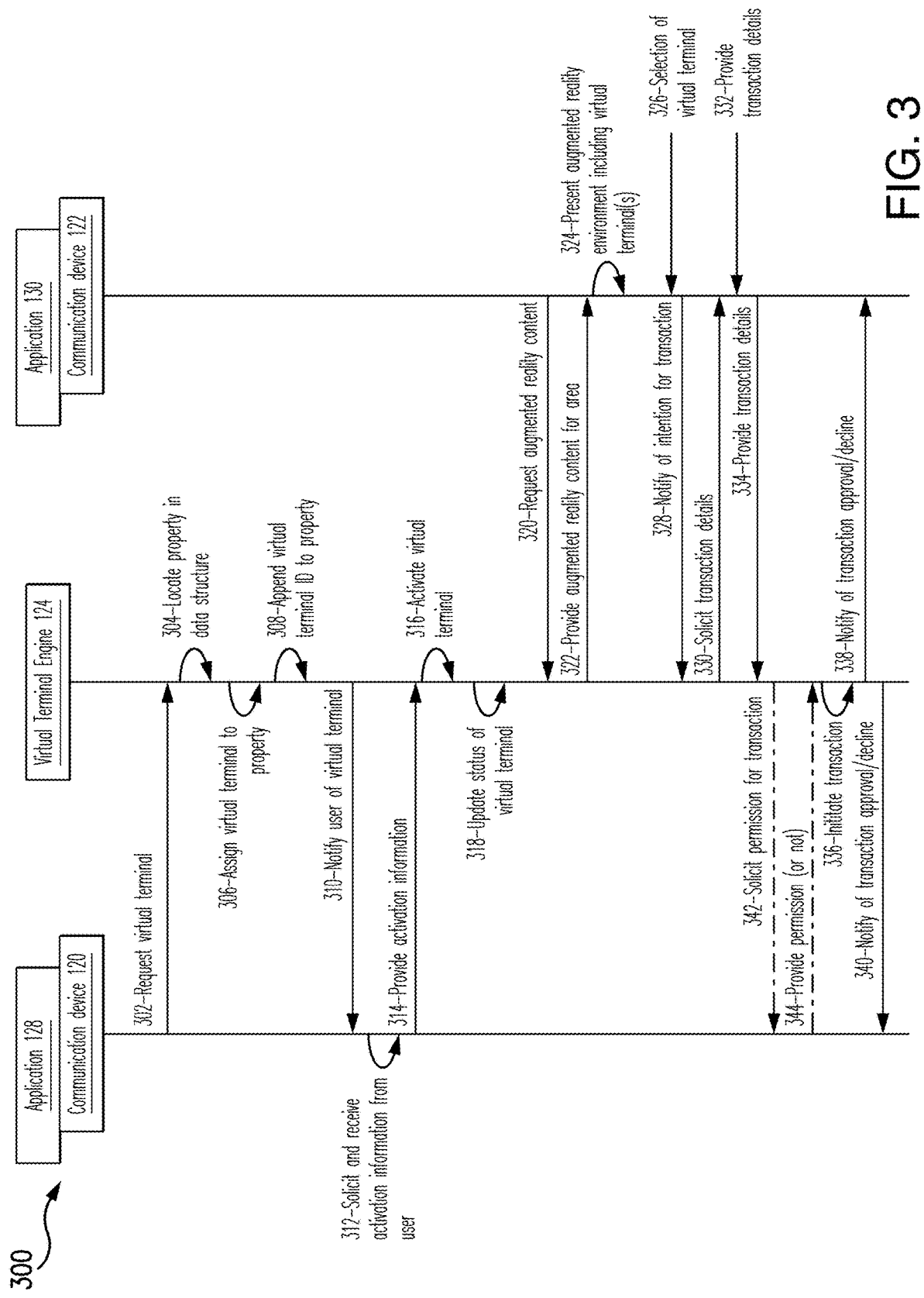
FIG. 3 is an exemplary method, which may be implemented via the system of FIG. 1, for use in facilitating a payment account transaction through a virtual terminal assigned to a property associated with a consumer involved in the transaction.

FIG. 3 illustrates an exemplary method 300 for use in facilitating a payment account transaction via a virtual terminal at a location associated with a party to the transaction. The exemplary method 300 is described with reference to the system 100, and as implemented, generally, in the virtual terminal engine 124 and the communication devices 120 and 122 (including the network-based applications 128 and 130) of the system 100, and further with reference to computing device 200. However, it should be understood that the method 300 is not limited to this configuration of the system 100, as the method 300 may be implemented, at least in part, in other parts in system 100, or in multiple other computing devices or systems. As such, the methods herein should not be understood to be limited to the exemplary system 100 or the exemplary computing device 200, and likewise, the systems and the computing devices herein should not be understood to be limited to the exemplary method 300.

What's more, the method 300 is described with reference to two transactions, including a garage sale example and a lawn care example. In the garage sale example, the user 108 is a home owner offering items for sale, and the initiating user 118 is a purchaser at the garage sale (i.e., paying funds to the user 108). And, in the lawn care example, the user 108 is a home owner having a lawn, and the initiating user 118 is a lawn service having just performed yard services at the property 104 (e.g., the initiating user 118 has cut the grass, sprayed the lawn, etc.) (i.e., is now soliciting funds from the user 108 for the services provided).

With that said, at 302, the user 108 submits, via the communication device 120 and/or application 128, a request to assign a virtual terminal to his/her property 104. In general, the request is identified to the communication device 120 and/or the user 108 (and/or the application 128), which is associated, in the virtual terminal data structure 126, with the property 104. In this manner, the user 108 requesting the virtual terminal may be limited to the particular user 108 (or communication device 120, etc.) known to be associated with the property 104.

In response to the request, the virtual terminal engine 124 locates, at 304, the property 104 in the virtual terminal data structure 126 and then assigns, at 306, the virtual terminal 132 to the property 104. While, in the method 300, the virtual terminal 132 is assigned in response to a request, it should be appreciated that the virtual terminal engine 124 may assign the virtual terminal 132 to the property 104 based on some other factors in other embodiments, such as, for example, the inclusion of the property in a neighborhood, a provisioning of virtual terminals in a region or area including the property, enrollment of the user 108 in an account with the banking institution 112, etc. In any case, once the virtual terminal 132 is assigned to the property 104, the virtual terminal engine 124 appends, at 308, an identifier associated with the virtual terminal 132 (e.g., a virtual terminal ID, etc.) to the property 104, and, in particular, to a property profile associated with the property 104 (e.g., in the virtual terminal data structure 126, etc.).

When the virtual terminal 132 is initially assigned to the property 104 (at 306 and 308), the virtual terminal 132 is not yet activated. That said, when the virtual terminal 132 is assigned based on a request by the user 108, it should be appreciated that the request may include sufficient information to assign and activate the virtual terminal 132 without further information from the user 108. When not activated, the virtual terminal engine 124 notifies, at 310, the user 108 of the assigned virtual terminal 132. The notification may include, without limitation, an email, text message, or a message delivered through the application 128, etc. The notification may be delivered when the virtual terminal 132 is assigned, or at some later time. Often, prior to activation, the virtual terminal 132 will be hidden or omitted from the augment realty environment associated with the virtual terminal engine 124. One potential exception, however, is that the user 108 may be able to view the virtual terminal 132 when disposed at the property 104 (e.g., to initiate activation, etc.), but not other users.

Upon notification, the user 108 activates the virtual terminal 132, either at the virtual terminal 132 in the augment realty environment or through one or more communications between the application 128 and the virtual terminal engine 124. Specifically, in connection with the notification, the communication device 120 and/or application 128 may solicit and/or receive, at 312, certain activation information related to the user 108, the property 104, and/or the virtual terminal 132 and/or the user 108, via the communication device 120 and/or application 128. The communication device 120 then provides, at 314, the activation information to the virtual terminal engine 124.

In connection with the activation of the virtual terminal 132, the user 108 may provide (e.g., in response to the solicitation, in response to another solicitation, etc.) one or more pieces of identifying information, including, without limitation, a payment account number associated with the payment account issued to the user 108 by the banking institution 112, etc. In addition, the user 108 may identify whether the virtual terminal 132 should be public or private (e.g., and, where private, who should be permitted to "see" the virtual terminal in the augment realty environment (e.g., as part of a white list of initiating users, etc.); etc.). The user 108 may also provide additional information such as, for example, an indication of the payment account type (e.g., personal, business, etc.), verification and/or authentication information, etc. Verification and/or authentication information may include, for example, a biometric for the user 108 (e.g., a finger print scan, an iris scan, a facial scan, etc.), geographic location data for the user 108, and/or other desired information (e.g., a PIN, password, etc.). It should be appreciated that when a biometric is provided, the communication device 120 or application 128 itself may verify and/or authenticate the user 108 via the biometric (e.g., by comparing the received biometric to a stored reference biometric, etc.). Alternatively, the biometric may be communicated to another system, component, etc. for verification and/or authentication (e.g., to the virtual terminal engine 124, etc.). It should also be appreciated that when geographic location data for the user 108 is provided (e.g., when the un-activated virtual terminal 132 is only viewable to the user 108, etc.), the user 108 may first locate the virtual terminal 132 within the property 104, such as, for example, on a driveway or in a backyard, etc. In this manner, the user 108 may be verified and/or authenticated (e.g., by the communication device 120 and/or application 128 itself, the virtual terminal engine 124, or another system or component, etc.) based on the geographic location data provided by the user 108 matching, or being consistent with, the location of the virtual terminal 132. Or, the communication device 120 and/or application 128 may derive the geographic location data for the user 108 (e.g., via GPS (e.g., when the user 108 is located at the property 104, etc.), etc.), and then use the data to verify and/or authenticate the user 108. It should further be appreciated that the information and/or options provided by the user 108 during activation of the virtual terminal 132 generally may be altered, after activation, by the user 108, through the application 128 and/or the communication device 120.

When the activation information is submitted and received, the virtual terminal engine 124 activates, at 316, the virtual terminal 132, and updates, at 318, a status of the virtual terminal 132 in the virtual terminal data structure 126. As part of updating the status of the virtual terminal 132, the virtual terminal engine 124 may further append the virtual terminal 132 to a public or private listing of available virtual terminals, for appending to the augmented realty environment (as specified by the user 108). That said, in multiple embodiments, as part of activation, the virtual terminal engine 124 may verify and/or authenticate the user 108 (consistent with the above), prior to activating the virtual terminal 132, for example, based on a biometric and/or geographic location data for the user 108. Further, when the property 104 is added to the virtual terminal data structure 126, certain data about the owner of the property 104 (e.g., the user 108, etc.) may already be included in the virtual terminal data structure 126. As such, in addition or in the alternative to verification and/or authentication based on a biometric and/or geographic location data of the user 108, the verification of the user 108 may include, simply, comparing details of the activation information to any details related to the user 108 in the virtual terminal data structure 126. Regardless of any manner in which the user 108 is verified and/or authenticated, if there are one or more discrepancies, the activation may be terminated, or halted until the user 108 and/or his/her relation to the property 104 may be verified and/or authenticated.

It should be appreciated that assignment and/or activation of the virtual terminal may include more or less steps in other methods and/or embodiments, than illustrated in FIG. 3.

In the garage sale example, after (or, potentially, before) selecting the items for purchase, the initiating user 118 launches the application 130 on the communication device 122 in order to initiate one or more payment account transactions with the user 108 for the selected items. In connection therewith in the method 300, the communication device 122 and/or application 130 requests, at 320, augmented reality content related to an area to build the augmented reality environment, where the area, in general, is an area around the location of the communication device 122 (e.g., the neighborhood 102, etc.). That said, the area may be different, for example, based on a search performed by the initiating user 118. It should be appreciated that such a request may include, merely, the application 130 and/or the communication device 122 providing its location to the virtual terminal engine 124. The virtual terminal engine 124 then, in response, provides, at 322, augmented reality content for the area, including, for example, locations and virtual terminal identifiers associated with one or more virtual terminals within the area (depending on whether the virtual terminals are public or private and, if private, whether they are available for viewing by the initiating user 118). In response, the communication device 122 and/or application 130 presents, at 324, the augmented reality environment to the initiating user 118.

Figure 4:
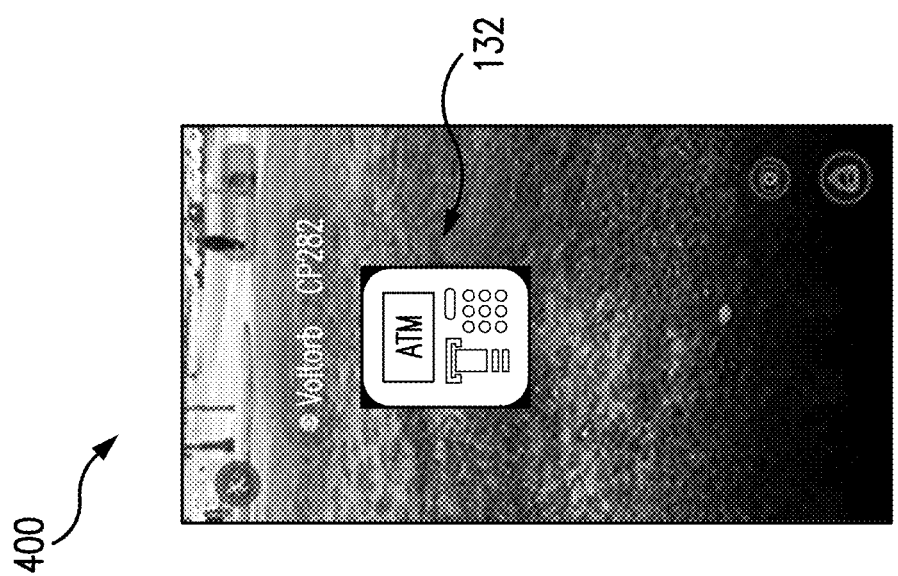
FIG. 4 is an exemplary interface that may be displayed to a consumer in connection with the system of FIG. 1 and/or the method of FIG. 3.

The initiating user 118 is then able to navigate at the property 104 to find the virtual terminal 132. FIG. 4 illustrates an exemplary interface 400 that may be displayed to the initiating user 118 at the communication device 122 and/or via the application 130 for use by the initiating user 118 to navigate to the virtual terminal 132. More specifically, the illustrated interface 400 includes the virtual terminal 132 shown with a reality background at the property 104. When the initiating user 118 arrives at the virtual terminal 132, he/she selects, at 326, the virtual terminal 132 (e.g., within the interface 400, etc.) to facilitate a transaction with the user 108 via the virtual terminal 132 (e.g., by selecting "Pay for Garage Sale Item [MM/DD/YY]," etc.). In this example, the initiating user 118 is attempting to purchase the items at the garage sale for $75.00. Upon selection of the virtual terminal 132, the communication device 122 and/or application 130 notifies the virtual terminal engine 124, at 328, of the intention of the initiating user 118 for the transaction, whereupon the virtual terminal engine 124 solicits, at 330, transaction details from the initiating user 118 via the communication device 122 and/or application 130 (e.g., payment account information, product information, price information, etc.).

In response, the initiating user 118 provides the transaction details to the communication device 122 (via the application 130) including, without limitation, an identification of the transaction as a purchase (as compared to a solicitation of funds), an amount, a payment account for the transaction (e.g., when the application 130 is not provisioned with a default account, etc.), and, potentially, an identification of an item(s) (e.g., good or service, etc.) to be purchased. The initiating user 118 also (implicitly or explicitly) provides approval of the transaction, which may be included in the transaction details. As such, the resulting transaction includes a purchase of items at the garage sale for the amount of $75.00. In general, the initiating user 118 is interacting with the virtual terminal 132, through the communication device 122 and/or application 130, in the augmented reality environment, to provide the transaction details. In turn, the communication device 122 and/or application 130 provides, at 334, the transaction details to the virtual terminal engine 124. It should be appreciated that the communication device 122 and/or application 130 may receive the transaction details provided to the virtual terminal engine 124 in various ways. For example, the initiating user 118 may himself/herself directly enter one or more transaction details into the communication device 122 and/or application 130. Additionally, or alternatively, one or more transaction details may be received from the initiating user 118 (at the virtual terminal 132 or prior to arriving at the virtual terminal 132) in response to the initiating user 118 selecting an augmented reality element via the communication device 122 and/or application 130. For example, and without limitation, the initiating user 118 may select an augmented reality element(s) (e.g., a virtual element associated with a physical item, etc.) which is associated with an amount and/or identification information, whereby the communication device 122 and/or application 130 may receive the amount and/or identification information upon selection.

With continued reference to the exemplary method 300, in response to receiving the transaction details from the initiating user 118, the virtual terminal engine 124 retrieves detail of the account of the user 108 with the banking institution 112 (e.g., a primary account number (PAN), a token, an expiration date, etc.), and then, initiates, at 336, a payment account transaction for the items to be purchased at the garage sale at the property 104 (e.g., compiles a request for the transaction, etc.). It should be appreciated that the virtual terminal engine 124, in connection with initiating the payment account transition, may submit (e.g., in the form of a request, etc.) transaction details (e.g., transaction and payment details associated with the initiating user 118, etc.) and account detail of the user 108 to the payment network 110 (as received during activation of the virtual terminal 132, etc.) to facilitate the transaction between the banking institution 114 of the initiating user 118 and the banking institution 112 of the user 108 (e.g., as indicated by path A in the system 100, etc.). The payment network 110, then, may notify the virtual terminal engine 124 that the transaction is approved, or declined. When the transaction is approved, the payment network 110 may provide receipt information, either to the virtual terminal engine 124 or elsewhere, such as, for example, a virtual wallet(s) or an online bank account portal(s) associated with the initiating user 118 and/or user 108 and/or to the communication devices 122 and/or 120 and/or the applications 130 and/or

128, whereby the initiating user 118 and/or user 108 may view the receipt information and the status of the transaction.

When the transaction is approved, or declined, the virtual terminal engine 124 notifies the initiating user 118 of the approval (or decline) of the transaction, at 338, at the communication device 122 and/or application 130. Likewise, the virtual terminal engine 124 notifies, at 340, the user 108 of the approval (or decline) of the transaction at the communication device 120 and/or application 128. In connection with notifying the initiating user 118 and the user 108 that the transaction is approved, the virtual terminal engine 124 may make available any receipt information received (e.g., from the payment network 110, etc.), in response to initiating the payment account transaction, to the initiating user 118 and/or user 108. For example, the virtual terminal engine 124 may provide receipt information to a virtual wallet(s) or an online bank account portal(s) associated with the initiating user 118 and/or user 108, whereby the initiating user 118 and/or user 108 may view the receipt information. Additionally, or alternatively, the virtual terminal engine 124 may provide receipt information to the communication devices 122 and/or 120 and/or the applications 130 and/or 128 of the initiating user 118 and/or user 108. Based on the notification and/or receipt information, the user 108 may then permit the initiating user 118 to leave the garage sale with the purchased items.

In the lawn care example, the method 300 is substantially consistent with the above example, but the user 108 has activated the virtual terminal to be a private virtual terminal, such that the general public is not able to view the virtual terminal 132. What's more, when the user 108 hired the initiating user 118 (or business associated therewith) to care for the property 104, the user 108 added the initiating user 118 to a "white list" of users able to view the virtual terminal 132 at the property 104 in the augmented reality environment.

After the business associated with the initiating user 118 renders the desired law care services, the initiating user 118, like above, launches the application 130 in the communication device 122 and navigates to the virtual terminal on the property 104. The initiating user 118 then provides a selection, at 326, of the virtual terminal 132, whereupon the communication device 122 and/or application 130 notifies the virtual terminal engine 124, at 328, of the intention of the initiating user 118 for the transaction. In response, the virtual terminal engine 124 solicits, at 330, transaction details from the initiating user 118, via the communication device 122 and/or application 130.

The initiating user 118 then provides the transaction details, at 332, including, without limitation, an identification of the transaction, a solicitation of funds, and an amount of the transaction, i.e., $125 in this example. Again, these details are provided through the initiating user's interactions with the virtual terminal 132, at the communication device 122 and/or application 130, in the augmented reality environment. In turn, the communication device 122 and/or application 130 provides, at 334, the transaction details to the virtual terminal engine 124.

In this example (as indicated by the dotted lines in FIG. 3), in response to receiving the transaction details from the initiating user 118, the virtual terminal engine 124 solicits a permission from the user 108, at 342, to proceed with the transaction. In particular, the user 108 receives the request for permission at the communication device 120 and/or through the application 128, and responds with permission, or not. At 344, the user 108 provides permission to the virtual terminal engine 124 for the transaction, through the communication device 120 and/or the application 128. In turn, then, the virtual terminal engine 124 retrieves detail of the account of the user 108 with the banking institution 112 and, initiates, at 336, a payment account transaction via the payment network 110 (as described above) for the yard services provided by the initiating user 118.

When the transaction is approved (or declined), the virtual terminal engine 124 notifies the initiating user 118 of the approval (or decline) of the transaction, at 338, at the communication device 122 and/or application 130, and further notifies, at 340, the user 108 of the approval (or decline) of the transaction at the communication device 120 and/or application 128. Based on the notifications, the user 108 and the initiating user 118 may understand the lawn care business to be paid for the services rendered. Alternatively, or additionally, the user 108 may provide receipt information to the initiating user 118 for the payment.

It should be appreciated that numerous scenarios may exist for use of the virtual terminals described herein, as assigned to properties, to facilitate payment account transactions. For example, a property may be temporary for a user, whereby the virtual terminal is assigned to the property and/or activated to the user 108 for a limited amount of time (e.g., a concession stand, etc.). After that time, then, the virtual terminal is deleted from the virtual terminal data structure 126, or de-activated and associated with a next user, who may then activate the virtual terminal. In still other embodiments, the property may be assigned multiple different virtual terminals, each associated with a different user at the property (or potentially the same user and then distributed to others). In one example, the user 108, as described above, may request that two virtual terminals be assigned to his/her property 104, where one virtual terminal is public and restricted to transactions with funds transferred to the user 108, and the other is private and restricted to transactions with funds transferred from the user 108. In still another example, different virtual terminals assigned to one property may be associated with and/or activated by different people, whereby the virtual terminal identifiers are visible in the augmented reality environment and whereby one virtual terminal may be distinguished from another as associated with one user over another (e.g., "John Smith's Virtual Terminal," etc.).

In view of the above, the systems and methods herein provide virtual terminals associated with locations of transferors/recipients of funds, whereby the recipients/transferors interact with the virtual terminals at the locations to initiate one or more transactions. Because the users of the virtual terminals interact via the virtual terminals in augmented reality environments, for example, personal identifying information passed between the parties to transactions may be limited, or even eliminated (such that the underlying transactions may be more secure than traditional transactions).

Again, and as previously described, it should be appreciated that the functions described herein, in some embodiments, may be described in computer executable instructions stored on a computer-readable media, and executable by one or more processors. The computer-readable media is a non-transitory computer-readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein. As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) assigning, by at least one computing device, a virtual terminal to a property, the property associated with a user; (b) activating, by the at least one computing device, the virtual terminal for a payment account associated with the user; (c) soliciting, by the at least one computing device, transaction details, from an initiating user, for a payment account transaction between an account associated with the initiating user and the payment account of the user, through the virtual terminal in an augmented reality environment, when the initiating user is present at the property; (d) initiating the payment account transaction based on the transaction details received from the initiating user and the payment account associated with the user, whereby funds are transferred between the initiating user and the user when the payment account transaction is approved; (e) soliciting, by the at least one computing device, activation information from the user for the virtual terminal, via an application at a communication device associated with the user, prior to activating the virtual terminal; (f) providing augmented reality content to an application at a communication device associated with the initiating user, thereby permitting the application to present the augmented reality environment to the initiating user, the augmented reality content including the virtual terminal when the communication device is proximate to the property; (g) transmitting the payment account transaction to a payment network associated with the payment account of the user and/or associated with the account of the initiating user for approval or decline; (h) notifying the initiating user, via an application at a communication device associated with the initiating user, when the payment account transaction is approved or declined, and/or notifying the user, via an application at a communication device associated with the user, when the payment account transaction is approved or declined; (i) soliciting, by the at least one computing device, permission for the payment account transaction from the user via an application at a communication device associated with the user; and (j) receiving permission from the user, via the application, prior to initiating the payment account transaction.

Exemplary embodiments are provided so that this disclosure will be thorough, and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for facilitating network transactions through a virtual terminal assigned to a property, the method comprising:

assigning, by at least one computing device, a plurality of virtual terminals to multiple physical residential properties identified in a data structure wherein each of the virtual terminals is allocated to only one of the multiple residential properties, wherein each of the multiple residential properties is associated with a residential user; and for each of the plurality of assigned virtual terminals:

after the virtual terminal is assigned to a residential property, soliciting, by the at least one computing device, activation information from the residential user associated with the residential property, through the virtual terminal in an augmented reality environment presented at a mobile device of the residential user at the assigned residential property, the activation information including account details for an account issued to the residential user;

activating, by the at least one computing device, the virtual terminal for the account of the residential user;

in response to a request from an initiating user, providing, by the at least one computing device, augmented reality content for the assigned residential property to a mobile device associated with the initiating user, whereby the virtual terminal is presented at the mobile device of the initiating user at the assigned residential property as part of the augmented reality environment;

soliciting, by the at least one computing device, transaction details from the initiating user, for a network transaction between an account associated with the initiating user and the account of the residential user, through the virtual terminal in the augmented reality environment presented at the mobile device of the initiating user at the residential property;

receiving, by the at least one computing device, the transaction details, via the virtual terminal at the mobile device of the initiating user;

initiating, by the at least one computing device, the network transaction based on the transaction details received from the initiating user via the virtual terminal and the account details received from the residential user via the virtual terminal; and notifying, by the at least one computing device, the initiating user, via the mobile device of the initiating user, when the network transaction is approved or declined.

2. The computer-implemented method of claim 1, wherein assigning the plurality of virtual terminals includes assigning the plurality of virtual terminals in response to the multiple residential properties being included in a neighborhood.

3. The computer-implemented method of claim 1, wherein soliciting the activation information from the residential user for the virtual terminal further includes soliciting the activation information from the residential user for the virtual terminal, via an application at the mobile device of the residential user, prior to activating the virtual terminal; and wherein activating the virtual terminal includes appending at least a portion of the activation information to a property profile associated with the residential property in the data structure, wherein the data structure is in communication with the at least one computing device.

4. The computer-implemented method of claim 3, wherein activating the virtual terminal further includes appending the virtual terminal to a private listing; and wherein providing the augmented reality content further includes providing the virtual terminal in the augmented reality content only when the initiating user is an identified user for the private listing.

5. The computer-implemented method of claim 1, wherein providing the augmented reality content further includes providing the augmented reality content to an application at the mobile device associated with the initiating user.

6. The computer-implemented method of claim 1, further comprising transmitting the network transaction to a payment network associated with the account of the residential user and/or associated with the account of the initiating user for approval or decline.

7. The computer-implemented method of claim 6, further comprising notifying the residential user, via an application at the mobile device of the residential user, when the network transaction is approved or declined.

8. The computer-implemented method of claim 1, further comprising:

soliciting, by the at least one computing device, permission for the network transaction from the residential user via an application at the mobile device of the residential user; and receiving permission from the residential user, via the application, prior to initiating the network transaction.

9. The computer-implemented method of claim 1, wherein the account details include at least one of a primary account number (PAN) and a token for the account of the residential user; and wherein initiating the network transaction includes retrieving at least one of the PAN and the token for the account of the residential user from the data structure.

10. A system for facilitating payment account transactions through a virtual terminal assigned to a property, the system comprising:

a computing device associated with a data structure and having a processor configured to:

assign a plurality of virtual terminals to multiple physical residential properties identified in the data structure, wherein each of the virtual terminals is allocated to only one of the multiple residential properties, wherein each of the multiple residential properties is associated with a residential user; and for each of the plurality of assigned virtual terminals:

after the virtual terminal is assigned to a residential property, solicit activation information from the residential user associated with the residential property, through the virtual terminal in an augmented reality environment presented at a mobile device of the residential user at the assigned residential property, the activation information including account details for a payment account issued to the residential user;

activate the virtual terminal for the payment account of the residential user;

in response to a request from an initiating user, provide augmented reality content for the assigned residential property to a mobile device associated with the initiating user, whereby the virtual terminal is presented at the mobile device of the initiating user at the assigned residential property as part of the augmented reality environment;

solicit transaction details from the initiating user for a payment account transaction between a payment account associated with the initiating user and the payment account of the residential user, through the virtual terminal in the augmented reality environment presented at the mobile device of the initiating user at the residential property;

receive the transaction details, via the virtual terminal presented at the mobile device of the initiating user; and initiate the payment account transaction based on the transaction details received from the initiating user via the virtual terminal and the account details received from the residential user via the virtual terminal, whereby funds are transferred between the payment account of the initiating user and the payment account of the residential user in response to the payment account transaction being approved.

11. The system of claim 10, wherein the processor of the computing device is further configured, in connection with soliciting the activation information, to solicit the activation information from the residential user for the virtual terminal, via an application at the mobile device of the residential user, prior to activating the virtual terminal; and wherein the processor of the computing device is configured, in connection with activating the virtual terminal, to append at least a portion of the activation information to a property profile associated with the residential property in the data structure.

12. The system of claim 11, wherein the processor of the computing device is further configured, in connection with activating the virtual terminal, to append the virtual terminal to a private listing and to provide the augmented reality content to the mobile device of the initiating user, the augmented reality content including the virtual terminal only when the initiating user is an identified user for the private listing.

13. The system of claim 10, wherein the processor of the computing device is further configured, in connection with providing the augmented reality content, to provide the augmented reality content to an application at the mobile device of the initiating user in connection with presenting the augmented reality environment to the initiating user, the augmented reality content including the virtual terminal.

14. The system of claim 10, further comprising a payment network associated with the payment account of the residential user and/or associated with the payment account of the initiating user, the payment network including the computing device; and wherein the payment network is configured to facilitate approval or decline of the payment account transaction.

15. The system of claim 14, wherein the processor of the computing device is configured to:

transmit a notification to the mobile device of the initiating user when the payment account transaction is approved or declined; and/or transmit a notification to the mobile device of the residential user when the payment account transaction is approved or declined.

16. The system of claim 10, wherein the processor of the computing device is configured to:

solicit permission for the payment account transaction from the residential user via an application at the mobile device of the residential user; and receive permission from the residential user, via the application, prior to initiating the payment account transaction.

17. The system of claim 10, wherein the account details include at least one of a primary account number (PAN) and a token for the payment account; and wherein the processor of the computing device is configured, in connection with initiating the payment account transaction, to retrieve at least one of the PAN and the token for the payment account of the residential user from the data structure in communication with the processor.

18. A non-transitory computer-readable storage media comprising executable instructions that, when executed by at least one processor, cause the at least one processor to:

assign a plurality of virtual terminals to multiple physical residential properties identified in a data structure, wherein each of the virtual terminals is allocated to only one of the multiple residential properties, wherein each of the multiple residential properties is associated with a residential user; and for each of the plurality of assigned virtual terminals:

after the virtual terminal is assigned to a residential property, solicit activation information from the residential user associated with the residential property, through the virtual terminal in an augmented reality environment presented at a mobile device of the residential user at the assigned residential property, the activation information including account details for a payment account issued to the residential user;

activate the virtual terminal for the payment account of the residential user;

in response to a request from an initiating user, provide augmented reality content for the assigned residential property to a mobile device associated with the initiating user, whereby the virtual terminal is presented at the mobile device of the initiating user at the assigned residential property as part of the augmented reality environment;

solicit transaction details from the initiating user located at the residential property for a transaction between the initiating user and the residential user through the virtual terminal in an augmented reality environment presented at the mobile device of the initiating user at the residential property; and compile a request for the transaction based on the transaction details and the account details received via the virtual terminal and transmit the request to a payment network associated with the payment account of the residential user to transfer funds between a payment account of the initiating user and the payment account of the residential user.

* * * * *